(12) United States Patent
Burr et al.

(10) Patent No.: US 7,823,008 B2
(45) Date of Patent: Oct. 26, 2010

(54) MAINTAINING CONSISTENCY IN A REMOTE COPY DATA STORAGE SYSTEM

(75) Inventors: Dale Burr, Hampshire (GB); Henry Esmond Butterworth, Hampshire (GB); Carlos Francisco Fuente, Hampshire (GB); William James Scales, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 11/848,772

(22) Filed: Aug. 31, 2007

(65) Prior Publication Data

US 2008/0059738 A1 Mar. 6, 2008

(30) Foreign Application Priority Data

Sep. 2, 2006 (GB) .................................. 0617342.1

(51) Int. Cl.
G06F 11/00 (2006.01)
(52) U.S. Cl. .................. 714/6; 714/11; 714/18; 714/20; 707/999.204
(58) Field of Classification Search ............ 714/4, 714/5, 6, 17, 18, 20, 42, 43, 56; 707/204, 707/999.204; 709/203; 711/162
See application file for complete search history.

(56) References Cited

U.S. PATENT DOCUMENTS

| | | | | |
|---|---|---|---|---|
| 6,148,383 A * | 11/2000 | Micka et al. | ................... | 714/20 |
| 6,978,347 B2 * | 12/2005 | Nakamura et al. | ............. | 714/5 |
| 7,111,189 B1 * | 9/2006 | Sicola et al. | ................... | 714/6 |
| 7,178,055 B2 * | 2/2007 | Ji et al. | .......................... | 714/6 |
| 7,251,743 B2 * | 7/2007 | Chen et al. | ..................... | 714/6 |
| 7,278,049 B2 * | 10/2007 | Bartfai et al. | ................... | 714/6 |
| 7,328,373 B2 * | 2/2008 | Kawamura et al. | ............ | 714/20 |
| 7,606,940 B2 * | 10/2009 | Yamagami | ..................... | 714/6 |
| 2004/0236983 A1 * | 11/2004 | Burton et al. | ................... | 714/6 |
| 2005/0188254 A1 * | 8/2005 | Urabe et al. | ................... | 714/6 |
| 2005/0223267 A1 * | 10/2005 | Fujibayashi | ................... | 714/6 |

* cited by examiner

*Primary Examiner*—Robert Neausoliel
*Assistant Examiner*—Joseph D Manoskey
(74) *Attorney, Agent, or Firm*—Century IP Group, Inc.; F. Jason Far-hadian, Esq.

(57) ABSTRACT

An apparatus configured to operate as a primary for a remote copy pair is provided. The apparatus comprises a journal component at said primary for generating journal entries for one or more uncompleted sequenced batches; a configurator responsive to an error indication from a secondary for enumeration of said one or more uncompleted sequenced batches; and a primary server responsive to said enumeration of said one or more uncompleted sequenced batches to reissue to said secondary one or more write requests for said one or more uncompleted sequenced batches, during recovery processing.

20 Claims, 3 Drawing Sheets

MAINTAINING CONSISTENCY IN A REMOTE COPY DATA STORAGE SYSTEM

FIELD OF INVENTION

The present invention relates generally to technology for data storage error management, and, more particularly, to efficiently managing errors in a remote copy data storage system.

BACKGROUND

Critical data is often protected against disasters by copying it to another site. One technique in use for this purpose is known as remote copy.

Remote copy is the pairing of a disk (or logical volume) with another disk for use as a backup. The original disk is known as the primary and the backup disk is known as the secondary. Whenever data is written to the primary it must also be written to the secondary to ensure the backup stays up to date. Remote copy may be implemented synchronously so that processing at the host is delayed until confirmation of the completion of the corresponding write at the secondary.

Remote copy may be also implemented asynchronously. Asynchronous remote copy means that the host that wrote the data to the primary is not delayed while data is copied to the secondary. That is, as soon as the data has been written to the primary, the host is notified of its completion. The data is then copied to the secondary asynchronously.

One of the main challenges when implementing asynchronous remote copy is maintaining consistency of the secondary disk. Maintaining consistency means keeping the secondary data in a state that the primary data could have been in at some point during the copying process. The secondary data is allowed to be "out of date" (i.e., a certain number of updates have not yet been applied to the secondary), but it cannot be allowed to be inconsistent.

One technique for maintaining consistency, while keeping resource consumption low and performance acceptable, is to use a set of client and server nodes to control the batching and sequencing of writes to a remote copy secondary system. Host writes that are by definition independent of one another can be batched up and issued with a sequence number, and the writes at the secondary can then be executed in sequence number order to maintain consistency at the secondary.

However, when a system is adapted to perform remote copy using sequence numbers to achieve data consistency in a multi-node system, a node that has been issued a sequence number may not be able to issue the secondary write for that sequence number. For example, the node may fail due to hardware or software issues, or it may lose communications with the other nodes. This creates a problem because until all writes for a sequence number have completed, writes for the next sequence number cannot start. So the loss of one node prevents the system from making progress.

In the above situation, since the primary writes for the I/Os that are now stalled may have already completed to the host, failing out the I/Os and letting the hosts recover from the problem is not an option. Instead, the system must wait for the error to be fixed, and then resend any secondary writes that had not completed at the time of the error, thus maintaining data consistency.

One possible way of dealing with this situation involves keeping a non-volatile record of all disk-sectors that are different between the primary and secondary. When a write arrives at the primary, a bit is set for the relevant disk sector. When the secondary write completes, the appropriate bit is cleared. After recovering from an error, the bitmap can be used to cause the writes for any sectors whose bits are set.

The problem with this solution is that it does not maintain data consistency during the recovery process. The bits are processed in an arbitrary order, so the system may send dependent writes out of order, thus leaving the secondary inconsistent. This could be safeguarded against by taking a snapshot of the secondary before starting the recovery, but this requires additional storage and processing overhead.

The above solution also has the problem that new write I/Os may be setting bits in the bitmap while the system is trying to clear it to process recovery I/O. This can mean that the recovery process takes a long time to complete, leaving the secondary inconsistent for an extended period, and increasing the recovery point objective to an unacceptable length of time.

It would thus be desirable to have a technological means for efficiently managing errors in a consistent remote copy data storage system.

SUMMARY

In accordance with one embodiment, a remote copy system is provided. The remote copy system comprises a primary storage system comprising a primary client; a primary server cooperatively coupled to the primary client; a configurator coupled to the primary client; a journal component coupled to the primary client; and an I/O processor for receiving write I/O commands from a host apparatus, the I/O processor in operative communication with the primary client.

The remote copy system may further comprise a secondary storage system comprising a secondary client coupled to the primary client; a secondary server coupled to the primary server and the secondary client; and an I/O handler in communication with at least one data storage device; wherein in response to receiving a write I/O and requests for a sequence number, the primary client batches up one or more concurrent write requests and sends a request sequence number message to the primary server, such that when a sequence number is granted, the primary client sends the write I/O to the secondary client, embedding the sequence number within the a write message.

The primary server receives the request sequence number messages from the primary client, batches up the one or more concurrent write requests, and replies to the primary client by sending the granted sequence number. The primary server further sends a first message to the secondary server providing the granted sequence number. The secondary client receives the write message from the primary client and places the write message on a queue, such that in response to receiving a confirmation associated with the sequence number for the write message, the secondary client executes the write message in the queue.

In one embodiment, when the write message is executed, the secondary client sends a completion confirmation to the primary client and secondary server. The secondary server may be configured to send a confirmation message to the secondary client, in response to receiving the first message from the primary server, so that the secondary client can process the write request for the granted sequence number.

The secondary server coordinates write operations by one or more secondary client to ensure that the write operations are processed according to a granted sequence number associated with each write operation to maintain data consistency. In response to receiving a threshold number of completion confirmations from the secondary client, the secondary server sends a confirmation message for another write operation to be performed by the secondary client.

In accordance with another embodiment, an apparatus configured to operate as a primary for a remote copy pair is provided. The apparatus comprises a journal component at said primary for generating journal entries for one or more uncompleted sequenced batches; a configurator responsive to an error indication from a secondary for enumeration of said one or more uncompleted sequenced batches; and a primary server responsive to said enumeration of said one or more uncompleted sequenced batches to reissue to said secondary one or more write requests for said one or more uncompleted sequenced batches, during recovery processing.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate technological means for efficiently managing errors in a consistent remote copy data storage system.

Figure 1:
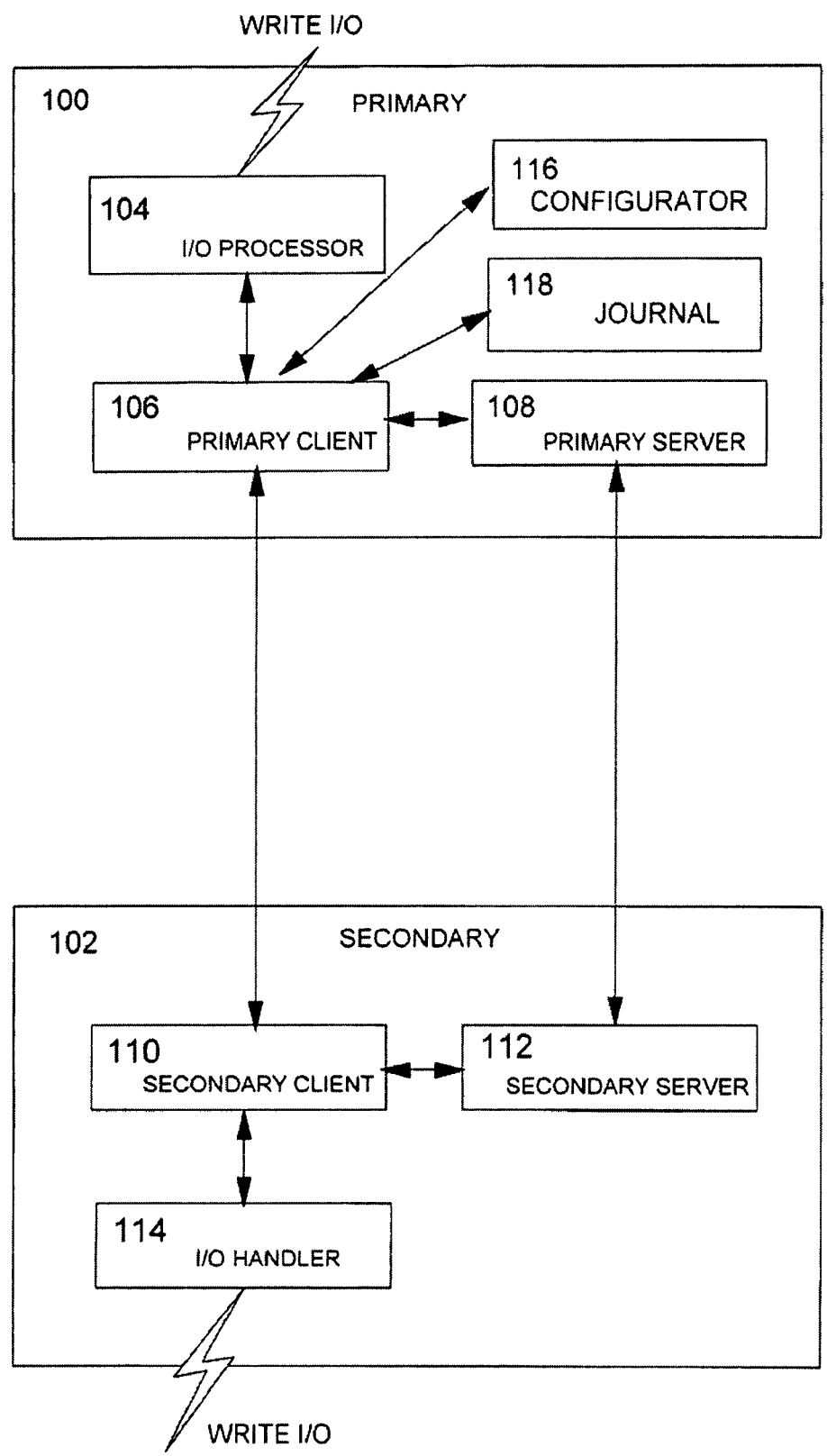
FIG. 1 illustrates a block diagram of an apparatus adapted to achieve consistent remote copy and to manage errors, according to an exemplary embodiment.

Referring to FIG. 1, there is shown an arrangement of components adapted to achieve consistent remote copy in accordance with one embodiment. As shown, primary 100 comprises an I/O processor 104 for receiving write I/O commands from a host apparatus (not shown). I/O processor 104 is in operative communication with primary client 106 which is cooperatively connected to primary server 108.

Secondary 102 comprises secondary client 110 which is operatively coupled to secondary server 112 and I/O handler 114. I/O handler 114 is configured for performing write I/Os and in communication with data storage (not shown). The data storage may comprise, for example, magnetic disk storage, tape storage or functional or structural equivalents thereof, without limitation.

Primary client 106 at primary 100 is linked over a communications link with secondary client 110 at secondary 102, and primary server 108 at primary 100 is linked over a communications link with secondary server 112 at secondary 102. Primary client 106 at primary 100 is further operatively connected to configurator 116 and to journal 118 to handle errors according to one embodiment.

The arrangement and location of primary and secondary clients and servers shown in the figures is intended to be exemplary, and many other arrangements may be implemented, as for example only, locating clients or servers at intermediate and communicating nodes of a data processing or communications network. Such alternative arrangements of client and server devices, systems or modules are well understood by those of ordinary skill in the art, and need not be further described here.

Figure 2:
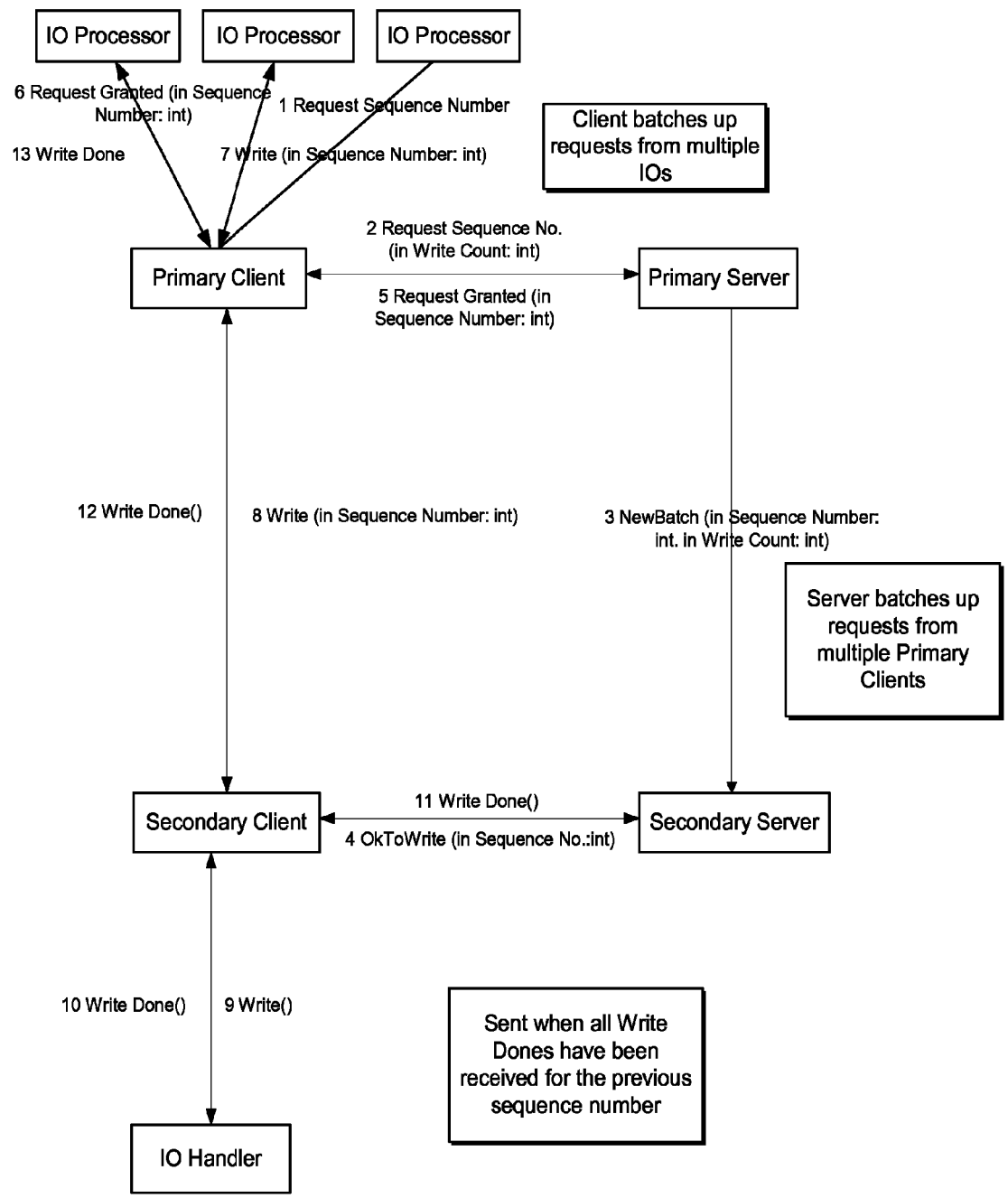
FIG. 2 illustrates a block diagram of a method or a logic arrangement to achieve remote copy consistency, in accordance with one embodiment.

Referring to FIGS. 1 and 2, an exemplary data storage system in accordance with one embodiment may comprise:

Primary Client. One or more nodes where write I/Os are received may have a primary client 106. When a write I/O is received, the I/O code requests a sequence number from the primary client 106. The primary client 106 batches up one or more concurrent requests and sends a request sequence number message to the primary server 108. When a sequence number is granted, the primary client 106 sends the write I/O to the secondary client 110, embedding the sequence number within the write message. In a multi-node system other nodes may have received their grants and completed their I/Os. One or more write I/Os that were active when the request sequence number was issued may be assigned the granted sequence number to prevent dependent writes being placed in the same batch.

Primary Server. One primary server 108 may exist. It receives request sequence number messages from the primary clients 106, batches up one or more concurrent write requests, and replies to the primary clients 106, sending them the granted sequence number. It also sends a NewBatch message to the secondary server 112, telling it the sequence number that was issued, and how many write I/Os were granted the sequence number.

Secondary Client. The secondary client 110 receives write messages from the primary client 106. Each write is placed on a queue. When the secondary client 110 receives an OkToWrite message for a sequence number secondary client 110 pulls one or more writes for this sequence number off the queue and executes them. When a write completes, secondary client 110 sends WriteDone messages to the primary client 106 and secondary server 112.

Secondary Server. The secondary server 112 receives NewBatch messages from the primary server 108. The secondary server 112 is responsible for coordinating the secondary clients 110, ensuring that writes are processed in sequence number order to maintain data consistency. When the first NewBatch arrives, the secondary server 112 sends an OkToWrite message to one or more secondary clients 110 so that the secondary clients 110 can process writes for the first sequence number as soon as they arrive. When the secondary server 112 has received the expected number of WriteDone messages (e.g., one WriteDone for each write in the batch), secondary server 112 sends OkToWrite messages for the next sequence number.

In accordance with one embodiment, a sequence of operations may be performed. The sequence may comprise (1) one or more of the I/O processors 104 issuing a request for a sequence number to the primary client 106; (2) the primary client 106 issuing the request for a sequence number to the primary server 108; (3) the primary server 108 issuing a new batch request to the secondary server 112, and batching up a plurality of requests that have been received from the primary clients; (4) the secondary server 112 sending a confirmation message (e.g., OKToWrite) message for the specified sequence number to the secondary client 110; the secondary server 112 may send the OKToWrite message when there are no outstanding writes for a previous sequence number, should one exist; (5) the primary server 108 may grant the request for a sequence number to the primary client 106; (6) the primary client 106 may pass a request granted message to a requesting I/O processor 104; (7) the I/O processor 104 in turn may issue a write for the specified sequence number to the primary client 106; (8) the primary client 106 may issue the write request for the specified sequence number to the secondary client 110.

It is noteworthy that the above sequence may be interrupted in the event of a failure, such that there will be writes at the secondary 102 which have not yet completed, and thus there may be a need for additional processing when the failure has been rectified. Also, recovery processing may be needed to put the secondary 102 back into a correct relationship with the primary.

One embodiment may be implemented to store a journal of one or more secondary writes not yet completed. Each journal entry may contain basic write details (e.g. disk and sector information), as well as the sequence number that was initially granted to the write by the primary server 108. After recovering from an error, the journal may be processed such that writes are executed in sequence number order, maintaining data consistency.

Accordingly, data consistency and recovery point objectives may be maintained at a similar level to that which prevails when normal write I/O is in progress. No or few snapshots of the secondary 102 may need to be taken, and thus advantageously no or limited extra storage or processing capability may be needed in one or more embodiments.

The implementation below provides an example of a method to be used in accordance with one embodiment. Because each node in the system may have its own journal, processing of the journals needs to be coordinated to ensure that writes are executed in order across the whole multi-node system. For example, one node may have a write for sequence number 15 which the node determines is to be executed.

Figure 3:
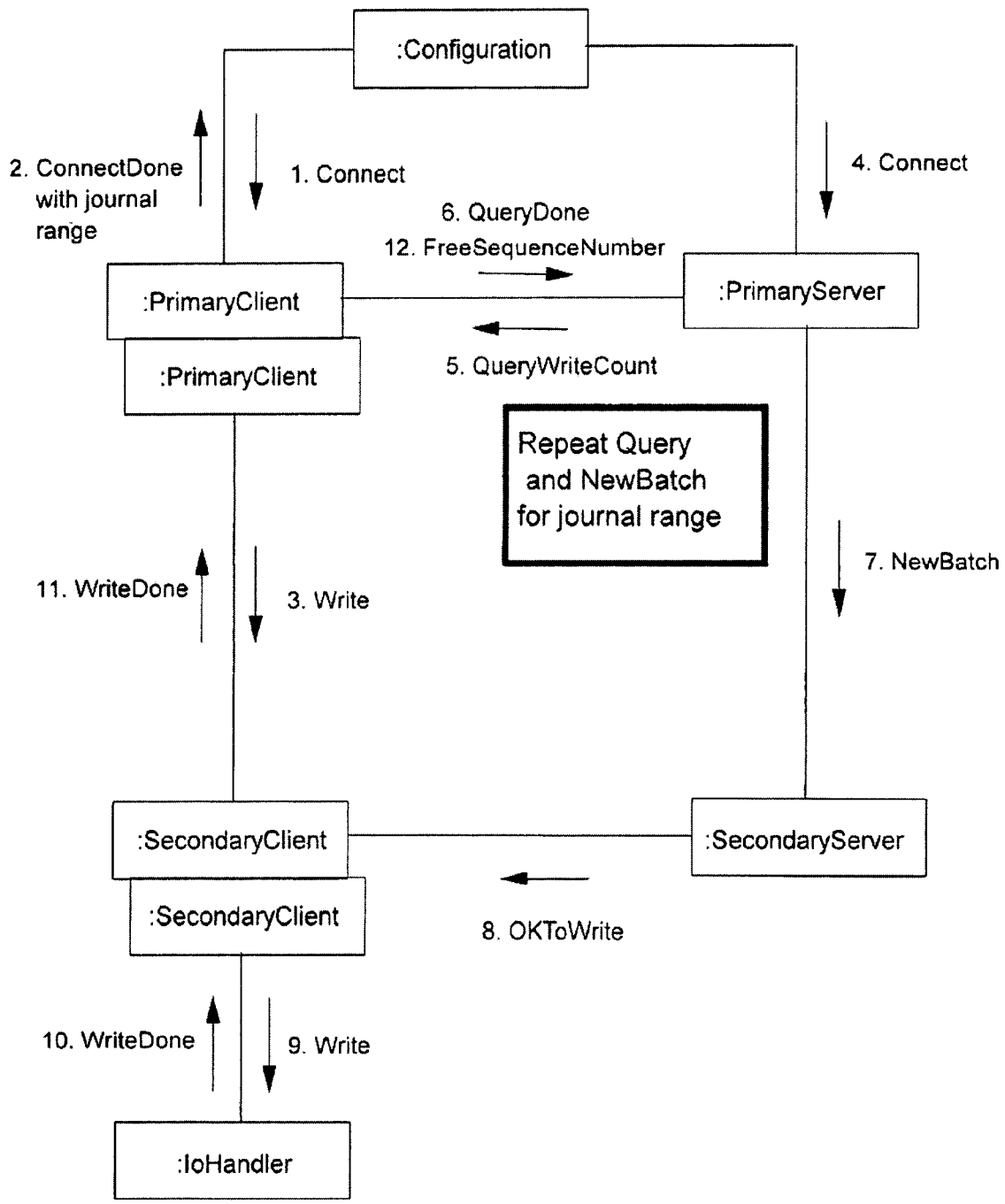
FIG. 3 illustrates a block diagram for a method of operation to manage errors in a remote copy system, according to one embodiment.

The central point of control for the recovery process is the primary server 108. The secondary client 110 and secondary server 112 work as normal, ensuring that one or more write batches are executed in sequence number order. The method or logic arrangement for recovery from errors according to another embodiment, as shown in FIG. 3, may comprise (1) a configurator 116 connecting to one or more primary clients 106; (2) primary client 106 examining its journal to determine the range of sequence numbers that were outstanding before the error, and the primary client 106 informing the configurator 116 of this range; (3) the primary client 106 may start to issue writes, such that the writes arrive at the secondary client 110 and stall, if their sequence number has not yet been accorded permission to proceed; (4) once one or more primary clients 110 have provided their ranges, the configurator 116 connects to the primary server 108, providing it the overall range of sequence numbers that are in use; (5) for each sequence number in the range, the primary server 108 may send a QueryWriteCount message; (6) a primary client 106 may respond with a QueryDone indicating the number of writes for the sequence number; (7) when a primary client 106 has responded, the primary server 108 may send a NewBatch message to the secondary server 112 for the corresponding sequence number. This NewBatch message may include a write count totaled across one or more primary clients for the sequence number, so that the secondary server 112 knows how many writes must complete before it starts processing the next sequence number. In one embodiment, the primary server 108 continues to send QueryWriteCount message for a sequence number relating to uncompleted writes that are to be reissued during recovery.

It may be desirable for the primary server 108 to know exactly which sequence numbers are outstanding, so that the primary server 108 is able to start issuing sequence numbers for new write I/Os. The write I/Os will be granted later sequence numbers than those used in the recovery I/Os, and so the writes to the secondary 102 (that is, both the recovery-related writes and any new writes) will be executed in the correct order.

When the secondary server 112 receives the first New-Batch, the secondary server 112 sends OkToWrite to one or more secondary clients 110. When the secondary client 110 receives the OkToWrite, it starts processing the stalled writes for this sequence number. The write process works as it does for normal write I/O. The IoHandler returns WriteDone to the secondary client 110. Thereafter, the secondary client 110 may return WriteDone to the primary client 106.

In a yet another embodiment, for a journal to be non-volatile and fault-tolerant, the journal may be stored on multiple nodes or on redundant storage. In other words, deleting a journal entry when a secondary write completes may not be instant. That is, the journal may contain more sequence numbers than the primary server 108 ever has outstanding at a given time. This may cause problems during the recovery process. To avoid this problem, a FreeSequenceNumber message may be added to the protocol.

When a primary client 106 has deleted an entry from its journal, it sends a FreeSequenceNumber message to the primary server 108. When one or more clients that were issued a sequence number have sent the FreeSequenceNumber message, the primary server 108 knows it is safe to issue a new sequence number.

In accordance with one embodiment, one central point of control (e.g., the primary server 108) is provided to make the processing simpler than coordinating multiple nodes, such that a node may recover independent of the other nodes.

It is noteworthy that the sequence of actions or steps disclosed in the above exemplary embodiments is provided by way of example and that in alternative embodiments such actions or steps may be performed in a different orders depending on implementation. For example, certain processes and operations provided above in sequential fashion may be processed concurrently and certain actions may be required to wait for the completion of other operations.

One or more embodiments may suitably and usefully be embodied in a logic apparatus, or a plurality of logic apparatus, comprising logic elements arranged to perform the method disclosed above. Such logic elements may comprise hardware components, firmware components or a combination thereof. A logic arrangement may suitably be embodied in a logic apparatus comprising logic elements to perform the method. Such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of one or more descriptions as well as signal-carrying media, such as wired or wireless signal-carrying media.

A method is conceived to be a self-consistent sequence of operations leading to a desired result. These operations require physical manipulations of physical quantities. Usually, though not necessarily, these quantities take the form of electrical or magnetic signals capable of being stored, transferred, combined, compared, and otherwise manipulated. It is convenient at times, for reasons of common usage, to refer to these signals as bits, values, parameters, items, elements, objects, symbols, characters, terms, numbers, or the like. It should be noted, however, that one or more of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies one or more or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

One or more embodiments may be realized in the form of a computer implemented method of deploying a service for deploying computer program code operable to cause said computer system to perform one or more processes. An alternative embodiment may be realized in the form of data carrier having functional data thereon, said functional data comprising functional computer data structures to, when loaded into a computer system and operated upon thereby, enable said computer system to perform one or more procedures.

It will be clear to one skilled in the art that many improvements and modifications can be made to the foregoing exemplary embodiment without departing from the scope of the present invention.

What is claimed is:

1. An apparatus configured to operate as a primary for a remote copy pair system, the apparatus comprising:
  a journal component for generating journal entries responsive to one or more uncompleted sequenced batches;
  a configurator responsive to an error indication from a secondary for enumeration of said one or more uncompleted sequenced batches; and
  a primary server responsive to said enumeration of said one or more uncompleted sequenced batches to reissue to said secondary one or more write requests for said one or more uncompleted sequenced batches, during recovery processing;
  one or more I/O processors issuing a request for a sequence number to a primary client;
  the primary client issuing the request for a sequence number to the primary server;
  the primary server issuing a new batch request to the secondary server batching up a plurality of requests that have been received from the primary clients; and
  the secondary server sending a confirmation message for the specified sequence number to the secondary client;
  wherein the primary server grants the request for a sequence number to the primary client, and the primary client passes a request granted message to a requesting I/O processor, and
  wherein the I/O processor in turn issues a write for the specified sequence number to the primary client and the primary client issues the write request for the specified sequence number to the secondary client.

2. The apparatus of claim 1, wherein when a write request for said uncompleted sequenced batches has been completed at said secondary, said consistency component permits new writes for said sequenced batches to said secondary.

3. The apparatus of claim 1, wherein said one or more write requests comprise concurrently executable write requests.

4. The apparatus of claim 1, wherein said remote copy pair comprises an asynchronous remote copy pair.

5. A method of operation for a primary of a remote copy pair, the method comprising:
  recording one or more journal entries by a journal component at a primary of a remote copy pair;
  enumerating, by a configurator, said one or more uncompleted sequenced batches, in response to an error indication provided by a secondary;
  during recovery processing, reissuing, by a primary server, to said secondary one or more write requests for said one or more uncompleted sequenced batches, in response to said enumeration of said one or more uncompleted sequenced batches;
  issuing by one or more I/O processors a request for a sequence number to a primary client;
  issuing by the primary client the request for a sequence number to the primary server;
  issuing by the primary server a new batch request to the secondary server batching up a plurality of requests that have been received from the primary clients; and
  sending by the secondary server a confirmation message for the specified sequence number to the secondary client;
  wherein the primary server grants the request for a sequence number to the primary client, and the primary client passes a request granted message to a requesting I/O processor, and
  wherein the I/O processor in turn issues a write for the specified sequence number to the primary client and the primary client issues the write request for the specified sequence number to the secondary client.

6. The method of claim 5, further comprising:
  permitting new writes for one or more sequenced batches to said secondary, in response to said one or more write requests for said one or more uncompleted sequenced batches having been completed at said secondary.

7. The method of claim 5, wherein said one or more write requests comprise concurrently executable write requests.

8. The method of claim 5, wherein said remote copy pair comprises an asynchronous remote copy pair.

9. A recording medium having computer readable instructions, such that when the instruction is executed by a computer system, the execution of the instructions causes:

a journal component, at a primary of a remote copy pair system, to generate one or more journal entries responsive to one or more uncompleted sequenced batches;

a configurator to enumerate said one or more uncompleted sequenced batches, in response to an error indication provided by a secondary of the remote copy pair system; and a primary server to reissue, during recovery processing, to said secondary one or more write requests for said one or more uncompleted sequenced batches, in response to said enumeration of said one or more uncompleted sequenced batches;

one or more I/O processors to issue a request for a sequence number to a primary client;

the primary client to issue the request for a sequence number to the primary server;

the primary server to issue a new batch request to the secondary server batching up a plurality of requests that have been received from the primary clients; and the secondary server to send a confirmation message for the specified sequence number to the secondary client, wherein the primary server grants the request for a sequence number to the primary client, and the primary client passes a request granted message to a requesting I/O processor, and wherein the I/O processor issues a write for the specified sequence number to the primary client and the primary client issues the write request for the specified sequence number to the secondary client.

10. The recording medium of claim 9, wherein new writes for one or more sequenced batches to said secondary are permitted, in response to said one or more write requests for said one or more uncompleted sequenced batches having been completed at said secondary.

11. The recording medium of claim 9, wherein the one or more write requests comprise concurrently executable write requests.

12. The recording medium of claim 9, wherein the remote copy pair system comprises an asynchronous remote copy pair.

13. A remote copy system comprising:
a primary storage system comprising:
  a primary client;
  a primary server cooperatively coupled to the primary client;
  a configurator coupled to the primary client;
  a journal component coupled to the primary client; and
  an I/O processor for receiving write I/O commands from a host apparatus, the I/O processor in operative communication with the primary client; and
a secondary storage system comprising:
  a secondary client coupled to the primary client;
  a secondary server coupled to the primary server and the secondary client; and
  an I/O handler in communication with at least one data storage device;

wherein in response to receiving a write I/O and requests for a sequence number, the primary client batches up one or more concurrent write requests and sends a request sequence number message to the primary server, such that when a sequence number is granted, the primary client sends the write I/O to the secondary client, embedding the sequence number within the a write message, and wherein one or more I/O processors issue a request for a sequence number to the primary client, the primary client issues the request for a sequence number to the primary server; the primary server issues a new batch request to the secondary server batching up a plurality of requests that have been received from the primary client; and the secondary server sends a confirmation message for the specified sequence number to the secondary client, wherein the primary server grants the request for a sequence number to the primary client, and the primary client passes a request granted message to a requesting I/O processor, and the I/O processor issues a write for the specified sequence number to the primary client and the primary client issues the write request for the specified sequence number to the secondary client.

14. The remote copy system of claim 13, wherein the primary server receives the request sequence number messages from the primary client, batches up the one or more concurrent write requests, and replies to the primary client by sending the granted sequence number.

15. The remote copy system of claim 14, wherein the primary server further sends a first message to the secondary server providing the granted sequence number.

16. The method of claim 15, wherein the secondary client receives the write message from the primary client and places the write message on a queue, such that in response to receiving a confirmation associated with the sequence number for the write message, the secondary client executes the write message in the queue.

17. The method of claim 16, wherein when the write message is executed, the secondary client sends a completion confirmation to the primary client and secondary server.

18. The method of claim 17, wherein the secondary server is configured to send a confirmation message to the secondary client, in response to receiving the first message from the primary server, so that the secondary client can process the write request for the granted sequence number.

19. The method of claim 18, wherein the secondary server coordinates write operations by one or more secondary client to ensure that the write operations are processed according to a granted sequence number associated with each write operation to maintain data consistency.

20. The method of claim 19, wherein in response to receiving a threshold number of completion confirmations from the secondary client, the secondary server sends a confirmation message for another write operation to be performed by the secondary client.

* * * * *